United States Patent [19]
Okoye

[11] Patent Number: 5,989,035
[45] Date of Patent: Nov. 23, 1999

[54] ARITHMETIC TEACHING DEVICE

[76] Inventor: Godwin Okoye, P.O. Box 4605, Albuquerque, N.Mex. 87196

[21] Appl. No.: 09/252,117

[22] Filed: Feb. 18, 1999

[51] Int. Cl.[6] .................................................. G09B 19/02
[52] U.S. Cl. ......................... 434/188; 434/191; 434/200; 434/209; 206/315.1
[58] Field of Search ..................................... 434/188, 191, 434/199, 200, 205; 229/220, 315, 323, 324, 810; 220/527, 528, 529, 507; 206/6.1, 566, 581, 315.1

[56] References Cited

U.S. PATENT DOCUMENTS

| | | | |
|---|---|---|---|
| 1,288,267 | 12/1918 | Stone | 206/581 |
| 1,507,915 | 9/1924 | Goldsmith | 106/581 |
| 5,366,069 | 11/1994 | Seidner | 220/207 |
| 5,439,108 | 8/1995 | Lackie | 220/527 |
| 5,638,838 | 6/1997 | Lombardi | 206/581 |
| 5,692,605 | 12/1997 | Lai | 206/6.1 |

*Primary Examiner*—Kien T. Nguyen
*Assistant Examiner*—Bena B. Milla

[57] ABSTRACT

A arithmetic teaching device for teaching a child mathematics. The arithmetic teaching device includes a housing that has a bottom and a peripheral sidewall upwardly extending from the bottom. A counting box has an open upper face and a plurality of compartments therein. The counting box is removably disposed in the housing. A plurality of counting objects are disposed in the housing. The counting objects are positionable in the compartments of the counting box.

13 Claims, 1 Drawing Sheet

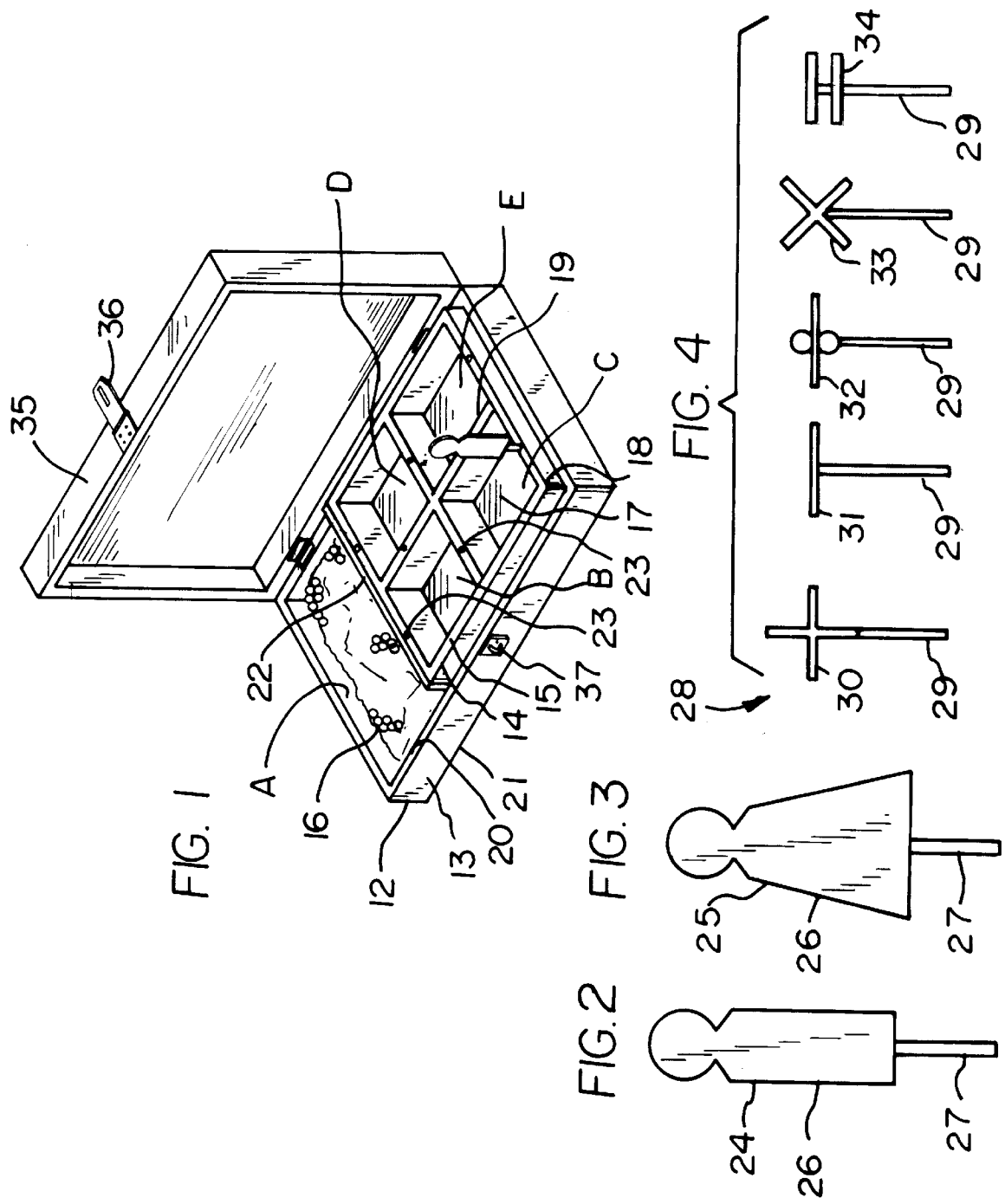

ARITHMETIC TEACHING DEVICE

BACKGROUND OF THE INVENTION

1. Field of the Invention

The present invention relates to teaching devices and more particularly pertains to a new arithmetic teaching device for teaching a child mathematics.

2. Description of the Prior Art

The use of teaching devices is known in the prior art. More specifically, teaching devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,688,126; U.S. Pat. No. 3,597,854; U.S. Pat. No. 4,993,952; U.S. Pat. No. Des. 214,054; U.S. Pat. No. 2,584,601; and U.S. Pat. No. 2,702,423.

While these devices fulfill their respective, particular objectives and requirements, the aforementioned patents do not disclose a new arithmetic teaching device. The inventive device includes a housing that has a bottom and a peripheral sidewall upwardly extending from the bottom. A counting box has an open upper face and a plurality of compartments therein. The counting box is removably disposed in the housing. A plurality of counting objects are disposed in the housing. The counting objects are positionable in the compartments of the counting box.

In these respects, the arithmetic teaching device according to the present invention substantially departs from the conventional concepts and designs of the prior art, and in so doing provides an apparatus primarily developed for the purpose of teaching a child mathematics.

SUMMARY OF THE INVENTION

In view of the foregoing disadvantages inherent in the known types of teaching devices now present in the prior art, the present invention provides a new arithmetic teaching device construction wherein the same can be utilized for teaching a child mathematics.

The general purpose of the present invention, which will be described subsequently in greater detail, is to provide a new arithmetic teaching device apparatus and method which has many of the advantages of the teaching devices mentioned heretofore and many novel features that result in a new arithmetic teaching device which is not anticipated, rendered obvious, suggested, or even implied by any of the prior art teaching devices, either alone or in any combination thereof.

To attain this, the present invention generally comprises a housing that has a bottom and a peripheral sidewall upwardly extending from the bottom. A counting box has an open upper face and a plurality of compartments therein. The counting box is removably disposed in the housing. A plurality of counting objects are disposed in the housing. The counting objects are positionable in the compartments of the counting box.

There has thus been outlined, rather broadly, the more important features of the invention in order that the detailed description thereof that follows may be better understood, and in order that the present contribution to the art may be better appreciated. There are additional features of the invention that will be described here in after and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new arithmetic teaching device apparatus and method which has many of the advantages of the teaching devices mentioned heretofore and many novel features that result in a new arithmetic teaching device which is not anticipated, rendered obvious, suggested, or even implied by any of the prior art teaching devices, either alone or in any combination thereof.

It is another object of the present invention to provide a new arithmetic teaching device which may be easily and efficiently manufactured and marketed.

It is a further object of the present invention to provide a new arithmetic teaching device which is of a durable and reliable construction.

An even further object of the present invention is to provide a new arithmetic teaching device which is susceptible of a low cost of manufacture with regard to both materials and labor, and which accordingly is then susceptible of low prices of sale to the consuming public, thereby making such arithmetic teaching device economically available to the buying public.

Still yet another object of the present invention is to provide a new arithmetic teaching device which provides in the apparatuses and methods of the prior art some of the advantages thereof, while simultaneously overcoming some of the disadvantages normally associated therewith.

Still another object of the present invention is to provide a new arithmetic teaching device for teaching a child mathematics.

Yet another object of the present invention is to provide a new arithmetic teaching device which includes a housing that has a bottom and a peripheral sidewall upwardly extending from the bottom. A counting box has an open upper face and a plurality of compartments therein. The counting box is removably disposed in the housing. A plurality of counting objects are disposed in the housing. The counting objects are positionable in the compartments of the counting box.

Still yet another object of the present invention is to provide a new arithmetic teaching device that allows a child to visually count objects and combine or split them up to learn addition, subtraction, division, and multiplication.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new arithmetic teaching device according to the present invention.

FIG. 2 is a schematic side view of a male figurine of the present invention.

FIG. 3 is a schematic side view of a female figurine of the present invention.

FIG. 4 is a schematic side view of mathematic symbols of the present invention.

DESCRIPTION OF THE PREFERRED EMBODIMENT

With reference now to the drawings, and in particular to FIGS. 1 through 4 thereof, a new arithmetic teaching device embodying the principles and concepts of the present invention and generally designated by the reference numeral 10 will be described.

As best illustrated in FIGS. 1 through 4, the arithmetic teaching device 10 generally comprises a housing 12 that has a bottom (not shown) and a peripheral sidewall 13 upwardly extending from the bottom. A counting box 14 has an open upper face 15 and a plurality of compartments B,C,D,E therein. The counting box is removably disposed in the housing. A plurality of counting objects 16 are disposed in the housing. The counting objects are positionable in the compartments of the counting box.

Preferably, the bottom of the housing is generally rectangular. The counting box has a generally rectangular base panel 17, a perimeter sidewall 18 extending therearound, and a plurality of cross members 19 intersecting each other generally perpendicularly to form the compartments.

A height of the peripheral sidewall of the housing is defined between upper and lower edges 20,21 thereof. A height of the perimeter sidewall of the counting box is defined between upper and lower edges thereof. Preferably, the height of the perimeter sidewall is less than about twice the height of the peripheral sidewall of the housing to help keep the counting objects from falling out of the compartments, especially when large numbers of counting objects are placed in a single compartment. Ideally, the height of the perimeter sidewall is between about one and one-half and two times the height of the peripheral sidewall of the housing.

The plurality of counting objects are disposed in the housing and are positionable in the compartments of the counting box. Ideally, the counting objects are generally spherical for easier grasping, especially from the smaller compartments.

Preferably, the housing has a retaining wall 22 extending between front and back sides of the housing and positioned adjacent the counting box. The retaining wall holds the counting objects in place when the counting box is removed. A height of the retaining wall is defined between upper and lower edges thereof. Ideally, the height of the retaining wall is about the same as the height of the perimeter sidewall of the counting box so that the counting objects are held in their compartment when the lid (discussed below) is closed and the counting box is removed.

Also preferably, the perimeter sidewall of the counting box has a plurality of holes 23 extending into its upper edge. There could also be holes into upper surfaces of the cross members of the counting box. Ideally, each of the holes of the counting box is positioned substantially centrally along side a unique compartment of the counting box.

One or more male and female figurines 24,25 each has a silhouette panel 26 and a mounting stick 27 extending downwardly from the silhouetted panel. The mounting sticks are insertable in the holes of the counting box. Each silhouette panel of a male figurine resembles a male silhouette. Each silhouette panel of a female figurine resembles a female silhouette.

Ideally, there is one male or female figurine for each compartment of the counting box. For example, if the counting box has four compartments, as shown in FIG. 1, there would be four figurines: two male and two female. If the counting box has six compartments (not shown), there would be six figurines: three male and three female.

Preferably, as shown in FIG. 4, a plurality of mathematics symbols 28 are also provided, each having a mounting rod 29 extending downwardly therefrom. The mounting rods are insertable in the holes of the counting box and/or cross members. The mathematics symbols include a plus symbol 30 and a minus symbol 31 and may further include a division symbol 32, a multiplication symbol 33, and an equals symbol 34.

Optionally, a lid portion 35 may close the housing. Preferably, the lid portion would be pivotally coupled to the housing. Ideally, the lid portion would also be dimensioned for closing the open upper face of the counting box when the counting box is disposed in the housing. The lid portion could include a latch 36 adapted for engaging a loop 37 of the housing.

This invention is one of the most powerful tool ever invented to help a child learn how to count objects on one on one basis. It is also designed to inculcate in a child a good sense of addition, subtraction, division and multiplication in a very short period of time.

In a test run, when users were given only the counting objects to count (without the housing or counting box), instead of counting these objects one for one, they tended to count one object twice or at times they count two objects as one. In some cases they could not count at all.

Among other things, this game will teach the child how to count properly. It will also inculcate a proper sense of addition, subtraction, multiplication and elementary division of numbers.

In an exemplary configuration of the invention, the housing has one compartment A, and the counting box has 4 compartments: B, C, D, and E. 100 plastic beads (counting objects) are included, as are a plus symbol (+), minus symbol (−), division symbol (÷), multiplication symbol (×), an optional equal symbol (=), and five assorted male and female figurines. Pencil and paper could be substituted for signs by actually writing the sign in use together with the mathematical functions being performed, eg. 2+2=4. Then have a child use this game to solve the problem. See directions below.

DIRECTIONS

TO COUNT:

Have the child count the beads by picking them one at a time from the beads storage compartment and dropping them into any other compartment. Have them tell you the total after each count. Select random numbers anywhere form one to one hundred and have the child count up to those numbers, paying attention to make sure they stop when they reach the chosen number. Try as many numbers as possible.

TO ADD:

Assume you want the child to add 2+2 and come up with the answer. Have the child pick and count two beads as mentioned earlier, placing the beads in one of the compartments as he or she counts. Then have the child count the second set of two beads while placing them in another compartment. Finally have the child combine the two sets of beads into one compartment and count them altogether. Ask the child to give you the sum of the total count. In this case, it will be four. Then make sure the child realizes that 2+2=4. Try different sets of numbers and request the answers from the child. Congratulate the child for every correct answer.

The mounting rod of the plus symbol may be placed in one of the holes of the counting box to give the child a visual reminder of the function being performed. This will increase the child's speed when performing arithmetic in that the child will see begin to associate a particular train of thought with the particular symbol. For example, the plus symbol could be placed in a hole in the cross member between two compartments to indicate that the counting objects in one adjacent compartment are to be added with the counting objects in the other adjacent compartment.

TO SUBTRACT:

If, for example, you want the child to subtract 4 from 10, or stated 10−4=?, have the child count up to ten beads as previously stated and drop them in one compartment as they are being counted. Then have the child remove four beads from the ten by picking them one at a time while counting and dropping them in the next compartment. Then have the child count the remaining beads and give you the answer. Then reiterate that ten minus four is six (10−4=6). Try a combination of different numbers making sure you congratulate the child for each correct answer. The mounting rod of the minus symbol may be placed in one of the holes of the counting box.

TO DIVIDE:

You might use the figurines when performing a dividing function. For example, to divide 12 by 3 (12÷3). Place three of the figurines in the holes on top of any three compartments. Then have the child count and separate twelve beads as usual by placing them on a flat surface as the child counts them. Then have the child divide the twelve beads among the three figurines by simultaneously dropping one bead into each of the three compartments until the twelve beads are gone. Then have the child count the beads and tell you how many there are in each of the compartments. This should be the right answer to this example problem. Have them try as many numeric combinations as possible and give you the answers. Again, congratulate the child for the right answer.

TO MULTIPLY:

For example, to multiple 2×2, have the child count two of the beads while dropping them on one of the compartments, then count another set of two beads into another compartment. Then have the child combine the two sets of beads into one compartment and count the total. Ask him or her for the answer. In this case, it will be four. Try different sets of numbers like 3×3, 4×4, 5×4, 6×4, 7×3, etc.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A teaching device for teaching mathematics, comprising:

a housing having a bottom and a peripheral sidewall upwardly extending from said bottom;

a counting box having an open upper face and a plurality of compartments therein, said counting box being removably disposed in said housing;

a plurality of counting objects being disposed in said housing, said counting objects being positionable in said compartments of said counting box;

wherein said counting box has a base panel, a perimeter sidewall extending therearound, and a plurality of cross members intersecting each other generally perpendicularly for forming said compartments;

at least one figurine having a silhouette panel and a mounting stick extending downwardly from said silhouetted panel, said perimeter sidewall of said counting box having a plurality of holes extending into an upper edge thereof, said mounting sticks being insertable in said holes of said counting box.

2. The teaching device of claim 1, wherein a height of said peripheral sidewall of said housing being defined between upper and lower edges thereof, a height of said counting box being defined between upper and lower edges thereof, wherein said height of said perimeter sidewall is less than about twice said height of said peripheral sidewall of said housing.

3. The teaching device of claim 2, wherein said height of said perimeter sidewall is between about one and one-half and two times said height of said peripheral sidewall of said housing.

4. The teaching device of claim 2, wherein said housing has a retaining wall extending between front and back sides thereof and positioned adjacent said counting box, said retaining wall being for holding said counting objects in place when said counting box is removed, wherein a height of said retaining wall is defined between upper and lower edges thereof, wherein said height of said retaining wall is about the same as said height of said counting box.

5. The teaching device of claim 1, wherein said counting objects are generally spherical.

6. The teaching device of claim 1, wherein said housing has a retaining wall extending between front and back sides thereof and positioned adjacent said counting box, said retaining wall being for holding said counting objects in place when said counting box is removed.

7. The teaching device of claim 1, wherein each of said holes of said counting box is positioned substantially centrally along side a respective one of the plurality of compartments of said counting box.

8. The teaching device of claim 1, wherein said figurines include at least one male figurines and at least one female figurines, said silhouette panels of said male figurines resembling a male silhouette, said silhouette panels of said female figurines resembling a female silhouette.

9. The teaching device of claim 1, wherein each of said silhouette panels resembles a respective mathematics symbol including a plus symbol and a minus symbol.

10. The teaching device of claim 9, wherein said mathematics symbols further include a division symbol and a multiplication symbol.

11. The teaching device of claim 1, further comprising a lid portion for closing said housing.

12. The teaching device of claim 11, wherein said lid portion is dimensioned for closing said open upper face of said counting box when said counting box is disposed in said housing.

13. A teaching device for teaching mathematics, comprising:

a housing having a generally rectangular bottom and a peripheral sidewall upwardly extending from said bottom;

a counting box having an open upper face and a plurality of compartments therein, said counting box being removably disposed in said housing;

said counting box having a generally rectangular base panel, a perimeter sidewall extending therearound, and a plurality of cross members intersecting each other generally perpendicularly for forming said compartments;

a height of said peripheral sidewall of said housing being defined between upper and lower edges thereof;

a height of said perimeter sidewall of said counting box being defined between upper and lower edges thereof;

wherein said height of said perimeter sidewall is less than about twice said height of said peripheral sidewall of said housing;

wherein said height of said perimeter sidewall is between about one and one-half and two times said height of said peripheral sidewall of said housing;

a plurality of counting objects being disposed in said housing, said counting objects being positionable in said compartments of said counting box;

wherein said counting objects are generally spherical;

said housing having a retaining wall extending between front and back sides thereof and positioned adjacent said counting box, said retaining wall being for holding said counting objects in place when said counting box is removed;

a height of said retaining wall being defined between upper and lower edges thereof, wherein said height of said retaining wall is about the same as said height of said perimeter sidewall of said counting box;

said perimeter sidewall of said counting box having a plurality of holes extending into said upper edge thereof;

wherein each of said holes of said counting box is positioned substantially centrally along side a respective one of the plurality of compartments of said counting box;

a plurality of male figurines each having a silhouette panel and a mounting stick extending downwardly from said silhouetted panel, said mounting sticks being insertable in said holes of said counting box, each said silhouette panel resembling a male silhouette;

a plurality of female figurines each having a silhouette panel and a mounting stick extending downwardly from said silhouetted panel, said mounting sticks being insertable in said holes of said counting box, each said silhouette panel resembling a female silhouette;

a plurality of mathematics symbols each having a mounting rod extending downwardly therefrom, said mounting rods being insertable in said holes of said counting box;

said mathematics symbols including a plus symbol and a minus symbol;

said mathematics symbols further including a division symbol and a multiplication symbol;

a lid portion for closing said housing, said lid portion being pivotally coupled to said housing;

said lid portion being dimensioned for closing said open upper face of said counting box when said counting box is disposed in said housing; and said lid portion including a latch adapted for engaging a loop of said housing.

* * * * *